United States Patent [19]

Luzio

[11] 4,126,817
[45] Nov. 21, 1978

[54] SERVO SYSTEM FOR MAINTAINING CONSTANT TENSION ON A WEB

[75] Inventor: Guillermo F. Luzio, Plano, Tex.

[73] Assignee: Xerox Corporation, Stamford, Conn.

[21] Appl. No.: 769,064

[22] Filed: Feb. 16, 1977

[51] Int. Cl.$^2$ ............... B65H 59/38; B65H 77/00; H02P 5/46; H02P 7/68

[52] U.S. Cl. ............... 318/7; 318/6; 355/40; 242/75.51

[58] Field of Search ............... 318/6, 7; 242/75.51; 355/39, 79, 40

[56] References Cited

U.S. PATENT DOCUMENTS

| | | | |
|---|---|---|---|
| 3,606,201 | 9/1971 | Petusky | 318/7 |
| 3,664,806 | 2/1972 | Belson et al. | 318/7 |
| 3,809,335 | 5/1974 | Mantey | 318/7 |
| 3,863,117 | 1/1975 | Paschetto | 318/7 |
| 3,880,521 | 4/1975 | Eppe et al. | 355/40 |
| 3,926,513 | 12/1975 | Silver et al. | 318/7 |

Primary Examiner—Robert K. Schaefer
Assistant Examiner—Eugene S. Indyk

[57] ABSTRACT

Apparatus for maintaining constant tension on a web during movement thereof, e.g., during positioning original documents in an exposure station of a reproduction machine. The web is coupled between a take up reel and a supply reel, with each reel being driven by an electric motor. The two motors are energized by a signal from the same source, except that the signal applied to the supply reel motor is the derivative of that applied to the take up reel motor. In such manner, the supply reel is energized during periods of acceleration or deceleration of the web thereby maintaining constant tension on the web during positioning.

12 Claims, 4 Drawing Figures

SERVO SYSTEM FOR MAINTAINING CONSTANT TENSION ON A WEB

CROSS REFERENCE TO RELATED PATENTS

U.S. Pat. No. 3,940,210 entitled "Programmable Controller for Controlling Reproduction Machines" by James M. Donohue, issued Feb. 24, 1976, having the same assignee as the present invention, is incorporated by reference herein.

BACKGROUND OF THE INVENTION

This invention relates to electrical control circuitry. More particularly, it involves a servo system for maintaining constant tension on a film or web during movement thereof.

There are many applications in which it is desirable, if not imperative, to maintain constant tensioning on a web during movement between one reel to another. In the past, this has been accomplished through somewhat complex servo systems utilizing spring biased buffer loops, capstans, clutches, etc. Unfortunately, these systems have tended to be difficult to implement and maintain, as well as unduly increasing the cost of the product in which they are utilized.

In the referenced patent recited above, a reproduction machine is disclosed in which copies are made from original documents in the form of image transparencies on a film. The film contains a plurality of documents in a preselected coded arrangement which can be individually addressed, or copied in sequence as desired. The film may be part of a reel to reel cassette, with the cassette being mounted in the exposure station of the machine. When a copy is desired of a particular original, the operator programs machine to move the film and position the desired original on the platen for making copies. The goal of present day reproduction machines is not only to provide good copy quality but also to be capable of producing large numbers of copies in a given amount of time. Consequently, the throughput of the machine depends upon how fast the machine can position the desired original on the platen. Consequently, it is of paramount importance in machines utilizing an automatic document handler such as that described in the Donohue patent that constant tension be maintained on the film during such positioning, e.g. so that the document lies flat against the platen during exposure.

OBJECTS AND SUMMARY OF THE INVENTION

Consequently, it is the primary object of this invention to provide a relatively simple apparatus for maintaining constant tensioning on a web during movement thereof.

It is another object of this invention to provide apparatus, in a reproduction machine, wherein original documents contained by a web are quickly positioned on the platen while maintaining constant tensioning of the web.

Briefly, these and other objects of the invention are accomplished through a servo system having electrical motors driving a take up and a supply reel, respectively. An electrical signal is utilized to energize the take up reel motor to move the web. Means are also provided for applying the derivative of that same signal to the supply reel motor. Consequently, constant tensioning is maintained on the web since the supply reel motor is energized during periods of acceleration and deceleration. In the reproduction machine environment, the web may contain the original documents either as photographic images or with the original documents themselves being attached to the web. The control signal to the take up motor causes the take up reel to rotate and move the web. When the desired document is over the platen in the exposure station, the control signal inhibits further movement of the web. The derivative of the control signal is applied to the supply motor to maintain constant tensioning on the web during positioning of the document over the platen.

BRIEF DESCRIPTION OF THE DRAWINGS

The features and advantages of the present invention will become more apparent upon reading the Description of the Preferred Embodiment set out below and by reference to the drawings in which.

DESCRIPTION OF THE PREFERRED EMBODIMENTS

Figure 1:
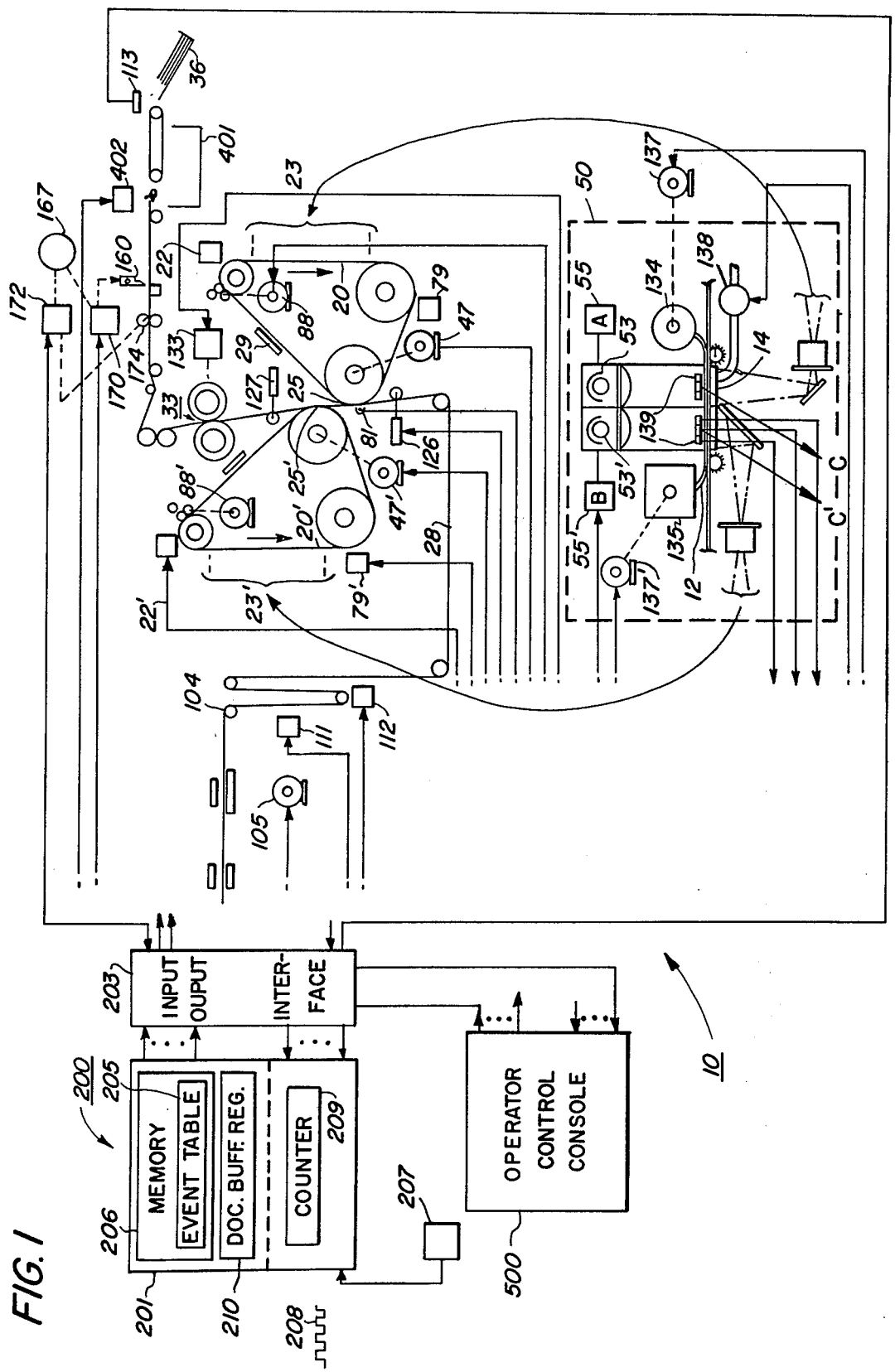
FIG. 1 is a schematic diagram of a reproduction machine in which the present invention finds particular utility.
Figure 2:
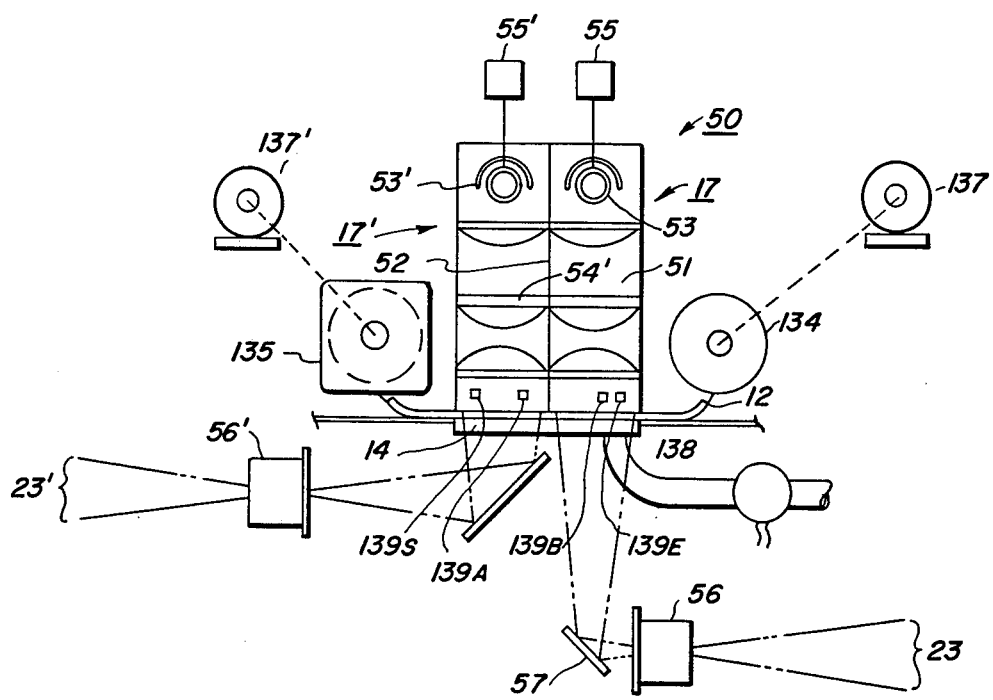
FIG. 2 is a schematic diagram of the exposure station for the reproduction machine shown in FIG. 1.
Figure 3:
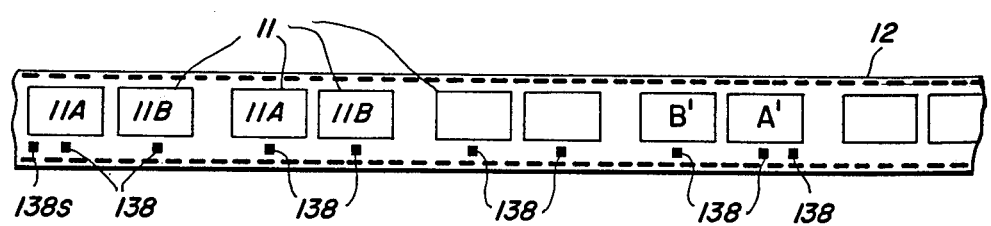
FIG. 3 is a view showing the original documents in the form of a plurality of film frames in series, each frame being coded for identification.

The present invention will be described in connection with its relation in a reproduction machine environment. More specifically, itss utility as a servo system for maintaining constant tensioning on a film containing original document images to be copied will be explained. However, it should be realized that the present invention can be utilized in a variety of applications for maintaining web tensioning. For example, the web in the document handler disclosed in U.S. Pat. No. 3,963,345 to Stemmle et al, issued June 15, 1976, could also be controlled by the servo system of the present invention.

Referring now to the drawings, the operation of reproduction machine 10 is disclosed in detail in the above referenced patent to Donohue. Consequently, only those portions of machine 10 which are relavent to the present invention will be described herein. For a more fuller description of the machine 10 the reader is urged to refer to the Donohue patent which is hereby incorporated by reference.

Briefly, machine 10 includes an exposure station 50 including a film 12 which contains photographic images of the original documents that are desired to be copied. For purposes of this invention, the term original or document should include any representation thereof. Consequently, the images on the film of the original document will be referred to merely as originals or documents, and are designated by the numeral 11. The film 12 is coupled between a take up reel 135 and a supply reel 134 disposed on opposite sides of platen 14. Substantially identical d.c. motors have their shafts directly coupled to the supply reel 134 and take up reel 135, respectively. For example, the motors 137 and 137' can be a d.c. motor such as the printed circuit armature motor No. V9M4 manufactured by Printed Motors, Inc. As described in the referenced patent, the reproduction machine 10 has the capability of providing two sided or duplexed copies simultaneously. Consequently, there is disclosed duplicate apparatus for carrying out the xerographic process, i.e., exposure, development, transfer, etc. However, to aid in clarity, only one portion of such system will be described herein. Exposure station 50 includes a lamp 55 and a condensor lens assembly 54 in a chamber 51 above platen 14 to expose the document 11 thereunder when the lamp is triggered. The light images generated upon actuation of lamp 55 are reflected by mirror 57 and are passed through focusing lens 56. In such manner, a latent electrostatic image is formed on portion 23 of a charged photoreceptor 20. The image is then developed at developing station 29, for example, by known magnetic brush developing apparatus. The developed image is then transferred at nip 25 onto copy paper 28. The transferred image is then affixed at fuser station 33 to form a permanent copy. Since copy paper 28 is in the form of a continuous roll, it is severed into individual copies of desired length by guillotine knife 160. Thereafter, the final copy is deposited in tray 36.

As disclosed in the referenced application, the operation of machine 10 is controlled by a programmable controller 200, for example, such as the INTEL 8080 microprocessor or PDP8/S computer. To operate the machine, the operator programs the controller 200 by entering information, e.g., number of copies desired, length of copies desired, etc., into operator console 500. This information is combined with the stored program in the memory 206 of the controller 200, with the controller 200 providing output signals via interface 203 to activate the various components of the machine 10 in a fixed timed sequence. Feedback control signals are also received by controller 200 through interface 203 to monitor the condition of the components and receive other relevant operating data. The documents 11 on film 12 are conveniently arranged in succession so that the film may be indexed serially to position successive documents 11 on the platen 14. However, the film may be indexed to position only particular ones of the documents 11 on the platen 14, if desired. To identify the individual documents, code marks 138 are provided along one side of film strip 12, with marks 138S and 138E being provided to identify starting and end documents thereby indicating the start and end of each document series. Control marks 138 are also relied upon to locate the individual documents 11 in proper position on platen 14. Suitable photoelectric detectors 139S, 139A, 139B, and 139E are provided adjacent platen 14 to reac the marks 138S, 138 and 138E on the film 12.

Photoelectric detectors 139 also provide feedback signals to controller 200 which are indicative of the particular document now on the platen 14. For example, as the film is advanced forwardly, detectors 139 increment an up/down counter 209 in the controller 200. If it is desired to bring a different document onto the platen 14, the operator inserts the appropriate document number into the control console 500. The desired number and the number stored in counter 209 are then compared by the controller 200. If the document number desired is greater than that stored in the counter 209, the controller 200 outputs a signal to the film drive motors 137 and 137' to advance the film 12 until the desired document 11 is on the platen 14. Conversely, if the number of the desired document is less than that stored in the counter, the film 12 will be rewound around supply reel 134 until the desired document is placed on platen 14. The details of the operation is more fully described in the referenced patent.

Figure 4:
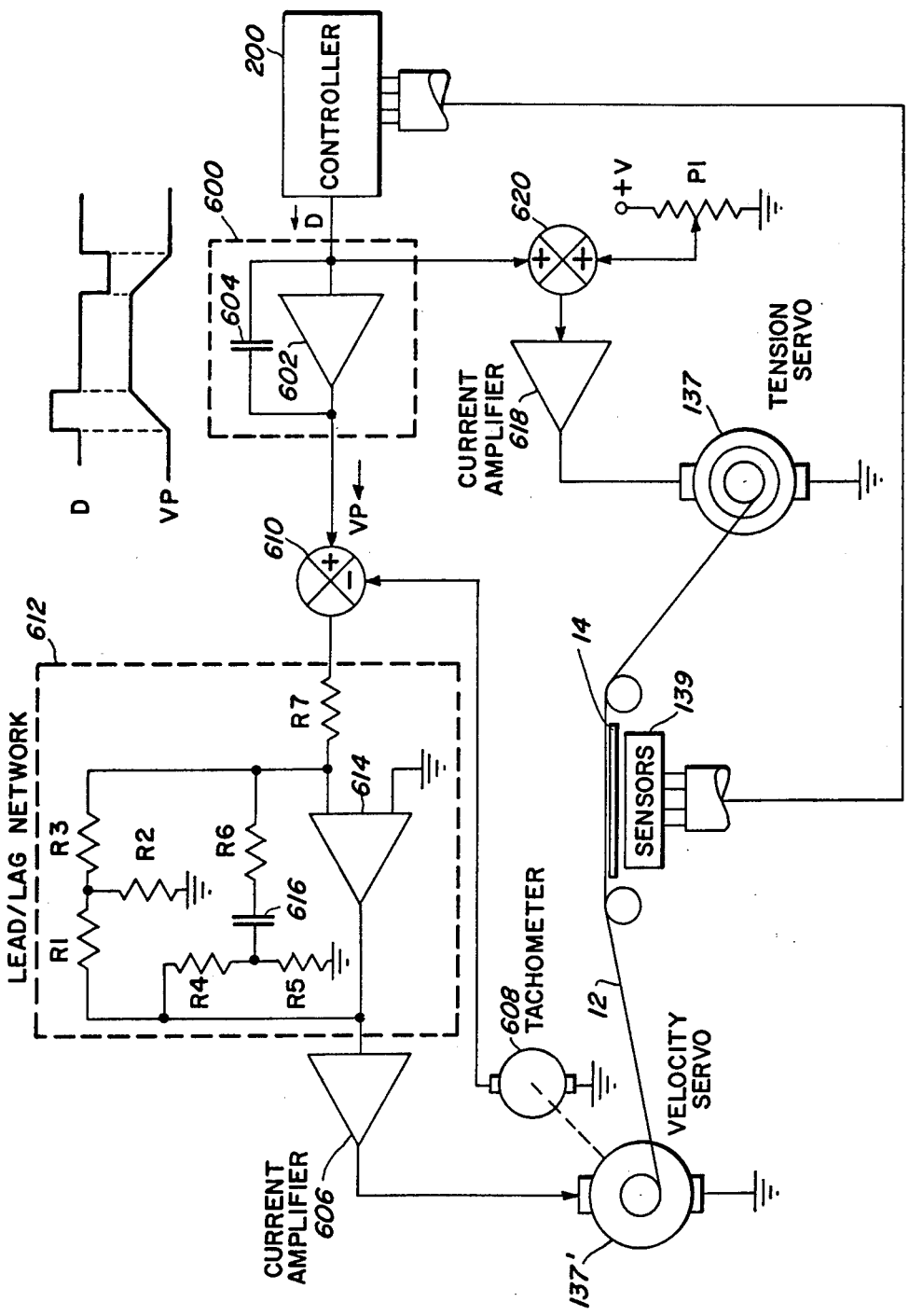
FIG. 4 is a schematic diagram of one embodiment of the servo system of the present invention.

Referring now particularly to FIG. 4, there is shown one embodiment of the servo system of the present invention for maintaining constant tension on the film 12 during positioning of the documents 11 on the platen 14. The controller 200 provides a control signal D in the form of a digital output pulse train. Depending upon whether the film 12 is to be advanced or reversed, control signal D will have a positive or negative pulse, with the positive pulse energizing the system to advance the film and the negative pulse to reverse the film 12. When positioning a particular document 11 on the platen 14, control signal D will accelerate the system (via a positive pulse) and decelerate and stop the system (via a negative pulse) so that the desired document 11 is on the platen 14. The film transport system can be envisioned as having two separate servo mechanisms, a velocity servo and a tensioning servo as labeled in FIG. 4. The velocity servo serves to control the velocity of the film 12 during positioning, whereas the tensioning servo provides constant tension on the film 12. It is important to note that both servos are energized by signals from the same source, here controller 200. However, the content of that signal from controller 200 is modified in such manner that the ultimate signal to the tensioning servo is the derivative of the signal to the velocity servo. In this embodiment, this is accomplished electrically by integrating control signal D by integrator 600. Integrator 600 is well known in the art, and conventionally is an operational amplifier 602 with a feedback capacitor 604. The output of integrator 600 produces a velocity profile signal designated as VP in the drawing. The positive going sloped portion represents acceleration, whereas the substantially flat portion represents a constant velocity, with the negatively sloped portion providing deceleration. Signal VP is amplified by current amplifier 606 whose output is coupled to the take up reel drive motor 137'. Current amplifier 606 can be an off the shelf item such as component number NC101 manufactured by Control Systems Research, Inc. It is an important that the amplifier 606 be a current amplifier as compared with a voltage amplifier. By utilizing a current amplifier which provides an output current to motor 137 depending upon the voltage input, the back EMF developed by the motor will not affect its drive signal. Consequently, even though the back EMF from the motor 137 increases with velocity, the current amplifier 606 will automatically compensate for the back EMF and maintain a current output which depends only upon the input signal VP.

A tachometer 608 is directly coupled to the shaft of motor 137'. For example, tachometer 608 can be a known device utilizing photoelectric or magnetic detectors which provides an output signal depending upon the velocity of rotation of the motor. The output of tachometer 608 is coupled to a comparator 610 which compares the actual velocity of motor 137' with the desired velocity according to signal VP. Comparators such as these are well known in the art and form no part of this invention. Also as known in the art comparator 610 will add or subtract a voltage level to the signal VP so that the output of comparator 610 will provide a drive voltage of such magnitude to bring it in line with the desired velocity profile signal VP.

To insure stability in the feedback system of the velocity servo, a lead/lag network 612 is provided. In this embodiment, lead/lag network consists of an operational amplifier 614 with parallel resistive and capacitive feedback circuits including resistors R1-R3, and R4-R6 and capacitor 616, respectively. As is known to those skilled in the art, lead/lag network 612 inhibits deleterious oscillations in the feedback circuit even though high gain is provided.

Referring now to the tensioning servo shown in FIG. 4, the nonintegrated control signal D is coupled to the supply motor 137 through current amplifier 618. Current amplifier 618 is preferably identical to that of current amplifier 606 as described above. Control signal D is the electrical equivalent of the derivative of velocity profile signal VP, since signal VP is derived by integrating control signal D. In other words, the derivative signal represents the change in velocity with respect to time. Consequently, supply motor 137 is pulsed only during periods of acceleration or deceleration of the take up motor 137'. A tension reference signal derived from potentiometer P1 is added to control signal D through summing junction 620. Consequently, control signal D either adds or subtracts to the voltage necessary to maintain the desired tension on the film. However, the addition of control signal D to the supply motor 137 serves to automatically compensate for the change in tensioning of the film during the periods of acceleration and deceleration.

It should be noted that while the take up motor 137' is regulating the velocity of the film 12, supply motor 137 is regulating tension or torque. Therefore, there is no conflict between the motors 137, 137' in load or velocity. Since supply motor 137 is driven by a constant current amplifier, the current to the motor 137 is regulated to be constantly proportional to the input voltage. Consequently, the supply motor 137 torque, in turn, is regulated since the motor torque is proportional to the armature current. This is true despite the velocity of the motor 137, since an increase of back EMF voltage automatically would demand an increase of amplifier output voltage to keep the armature current constant with respect to a constant reference voltage at its input. When a particular document 11 is to be positioned at the platen 14, the take up motor 137' is accelerated and then decelerated to position the document 11 on platen 14. The length of time of acceleration and deceleration depends upon the distance between the document now on the platen and the document desired to be placed on the platen for copying. Since the supply motor 137 is driven by a reference signal which includes the derivative of the velocity profile signal VP, the torque of the supply motor 137 is pulsed during acceleration and deceleration. The velocity of the supply motor 137, however, is controlled by the take up motor 137' due to film coupling. However, during acceleration and deceleration of the take up motor 137', the supply motor 137 will be pulsed to increase or reverse the torque during transients in order to move or stop the inertia load thereby keeping the film relatively constant.

From the foregoing description, it can be now realized that the present invention provides a unique, but relatively simple servo system that can be easily implemented to maintain a constant tension on a web. The system has only two moving parts, motors 137 and 137', thereby increasing the reliability of the system since it does not require the use of capstans, clutches, springs, buffer arms, etc. While the system of the present invention finds particular utility in positioning documents in a reproduction machine, it should not be so limited since the general concepts can be utilized in a variety of applications. Therefore, although this invention has been described in connection with a particular example thereof, no limitation is intended thereby except as defined in the appended claims.

What is claimed is:

1. Apparatus for maintaining constant tension on a web during movement thereof, said apparatus comprising:
supply means coupled to one end of the web for supplying said web during movement;
take up means coupled to the other end of the web for receiving said web from the supply means;
means for applying an energizing signal to the take up means for causing movement of said web; and
means for applying the derivative of that signal exclusively to the supply means to thereby maintain constant tension on the web during movement between said supply and take up means.

2. The apparatus of claim 1 wherein said supply and take up means each include:
a reel; and
an electrical motor, with its shaft being directly coupled to its respective reel.

3. The apparatus of claim 2 which further comprises:
at least two current amplifiers, one amplifier for amplifying said energization signal for driving said take up motor, with the other amplifier amplifying the derivative of the energizing signal for driving said supply motor.

4. In a reproduction machine for making copies of original documents, said machine having a station for exposing the documents to a photoreceptor, the improvement comprising:
a web containing a plurality of documents;
a supply reel coupled to one end of the web;
a take up reel coupled to the other end of the web;
a motor for driving said supply reel;
a motor for driving said take up reel;
means for providing a control signal to one of said motors for energizing the motor thereby causing movement of the web; and
means for applying the derivative of that control signal exclusively to the other motor to thereby maintain constant tension on the web during movement from one reel to the other.

5. The improvement of claim 4 wherein said take up reel and said supply reel are disposed on opposite sides of a platen in the exposure station.

6. In a reproduction machine having an exposure station for exposing original documents to a photoreceptor for making copies thereof, with said documents being contained in a web; a servo system for positioning said documents in the exposure station while maintaining constant tension on the web, said system comprising:
a supply reel coupled to one end of the web;
a take up reel coupled to the other end of the web;
a motor having its shaft coupled to said supply reel;
a motor having its shaft coupled to the take up reel;
means for producing a pluse-like control signal for energizing said motors;
current amplifier means for applying said control signal to the supply motor;
integrator means for integrating said control signal;
current amplifier means for applying said integrated signal exclusively to said take up reel motor;

whereby said system maintains constant tension on the web during positioning of the documents in the exposure station.

7. The system of claim 6 which further comprises:
means for detecting the angular velocity of the take up motor shaft; and
feedback means for compensating for the difference, if any, between the actual velocity of the take up motor and the desired velocity as represented by the integrated control signal.

8. A method of maintaining constant tension on a web during movement between a supply and take up reel, said method comprising:
driving said reels with substantially identical motors;
applying a control signal to the take up reel motor; and
applying the derivative of that signal exclusively to the supply reel motor.

9. The method of claim 8 wherein the control signal and its derivative are amplified by a current amplifier prior to application to their respective motors.

10. A method of positioning documents contained in a web in an exposure station of a reproduction machine, said method comprising:
coupling one end of the web to a take up reel;
coupling the other end of the web to a supply reel;
driving each reel with a motor, respectively;
energizing the take up reel motor with a control signal; and
exclusively energizing said supply motor with the derivative of that signal thereby maintaining constant tension on the web during movement thereof.

11. The method of claim 10 which further comprises:
making each document with an identification code;
sensing the identification codes as the documents are moved through the exposure station; and
stopping the movement of the web when the desired document is in the exposure station.

12. The method of claim 11 which further comprises:
producing said control signal in accordance with the difference between the document identification code sensed in the exposure station and the code of a document desired to be copied.

* * * * *